(12) United States Patent
Boies et al.

(10) Patent No.: US 6,266,589 B1
(45) Date of Patent: Jul. 24, 2001

(54) SPEED-BASED DISABLING OF FUNCTIONALITY FOR AUTOMOTIVE APPLICATIONS

(75) Inventors: Stephen J. Boies; John F. Kelley, both of Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/443,388

(22) Filed: Nov. 19, 1999

(51) Int. Cl.$^7$ ............................. G06F 3/14; B60Q 9/00
(52) U.S. Cl. ..................................... 701/36; 701/1
(58) Field of Search .................. 701/1, 36, 211

(56) References Cited

U.S. PATENT DOCUMENTS

| | | | |
|---|---|---|---|
| 4,564,917 | * | 1/1986 | Yamada et al. ..................... 701/1 |
| 5,404,443 | * | 4/1995 | Hirata ................................ 345/327 |
| 5,510,983 | * | 4/1996 | Iino .................................... 701/1 |
| 5,781,872 | * | 7/1998 | Konishi et al. ..................... 701/36 |
| 5,951,621 | * | 9/1999 | Palalau et al. ..................... 701/200 |
| 6,029,110 | * | 2/2000 | Zuber et al. ....................... 701/200 |
| 6,088,652 | * | 7/2000 | Abe .................................... 701/208 |
| 6,122,682 | * | 9/2000 | Andrews ............................ 710/65 |

* cited by examiner

*Primary Examiner*—Michael J. Zanelli
*Assistant Examiner*—Eric M Gibson
(74) *Attorney, Agent, or Firm*—McGuireWoods, LLP; Stephen C. Kaufman

(57) ABSTRACT

A motor vehicle safety system determines the state of automotive electronic devices as a function of speed to minimize potential distractions to the driver. Vehicle speed data is supplied to a rules based system which applies rules to determine what functions, at a given speed, within the respective electronic devices are available.

7 Claims, 2 Drawing Sheets

SPEED-BASED DISABLING OF FUNCTIONALITY FOR AUTOMOTIVE APPLICATIONS

BACKGROUND OF THE INVENTION

1. Field of the Invention

The present invention generally relates to automotive safety systems and, more particularly, to a speed-based system for disabling the functionality of automotive applications.

2. Background Description

There are an increasing number of increasingly-sophisticated electronic applications appearing in automobiles. Current examples include cellular telephones, multi-function entertainment systems, Global Positioning Satellite (GPS) mapping systems, environment/air-conditioning systems with digital displays, digital compasses, etc. Future examples are likely to include sophisticated, integrated computerized systems with multi-function displays. As is known from human factors studies of military aircraft, there are times during the operation of a vehicle when driver performance (and safety) can be dangerously compromised when attention is diverted from the immediate task of operating the vehicle.

SUMMARY OF THE INVENTION

It is therefore an object of the present invention to reduce the number of potential distractions to a driver of an automotive vehicle as the speed of the vehicle increases.

The invention applies rule-based global heuristics across electronic device functions in the driver's "cockpit" to gate which potentially distracting states (e.g. functionality) of various electronic devices are available to the driver as a function of speed of the vehicle. For example, if an FM or Internet radio has a visual display which could show the track name and artist name (and perhaps a graphic representation of the album cover), that portion of the functionality might only be available when the vehicle is traveling at a speed less than 30 miles per hour (mph). At greater speeds, only the audio portion of the radio would be functional, and the graphic display would be turned off. Another example is the visual mapping portion of a GPS way-finding aid would be turned off unless the car was stopped, leaving only the audio portion giving driving directions when the car is in motion.

In a specific embodiment, vehicle speed data is supplied to a rules based system which applies rules that determine the state of various electronic devices at a given speed. The output of the rules based system is applied by a mechanism which communicates on/off decisions to the electronic devices.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
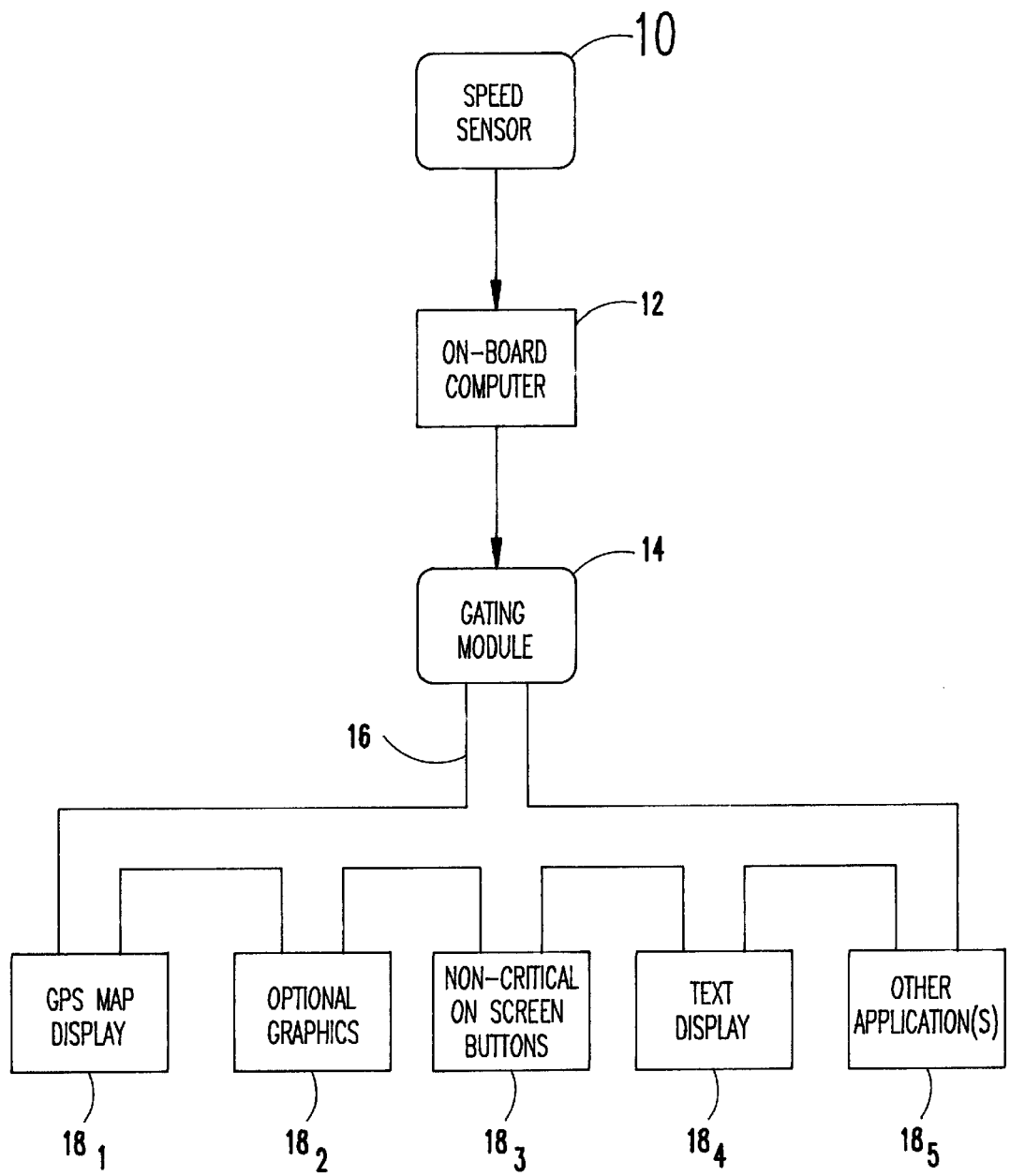
FIG. 1 is a high level block diagram showing the basic components of a preferred embodiment of the invention.

Referring now to the drawings, and more particularly to FIG. 1, there is shown a high level block diagram of a preferred embodiment of the invention. Although the invention will be described in terms of an automobile, it should be understood that the invention can be practiced in other vehicles such as trucks of varying sizes, recreational vehicles, sport utility vehicles, and the like. In modern automobiles, a speed sensor 10 (e.g., an electromagnetic sensor or the like) generates a speed signal which is supplied as one of many inputs to an on-board computer 12 of the automobile. The on-board computer 12 generates, among other information, output data representing the speed of the vehicle. The speed information is supplied to a gating module 14 which reads the current speed and, in turn, applies a set of rules to update an internal set of functionality flags that determine the state of various electronic devices. It should be understood that means other than an on-board computer 12 may provide speed information to the gating module. In effect, the gating module 14 is a rule based system which determines the state, as a function of vehicle speed, of devices that may have potentially distracting functions. The condition of the functionality flags of the gating module may either be queried over the communication bus 16 by the various automotive application functions $18_1$ to $18_n$ of each electronic device, or sent by the gating module 14 to functions $18_1$ to $18_n$. For example, depending on the speed, the gating module 14 may first determine whether particular electronic devices should be enabled or disabled and, if enabled, what portion of the full functionality can be provided to the driver as a function of automobile speed. In the context of a GPS mapping system, the functionality may include, but is not limited to, a GPS map display $18_1$, optional graphics $18_2$, non-critical on screen buttons $18_3$, and text display $18_4$. Although these functionalities are all visual in nature (e.g. visual displays) the invention is not limited to such displays but can include, in appropriate circumstances, functions that include audio input and output as well.

An example of the rules applied by the gating module 14 is illustrated in the following pseudocode:

```
If speed>30
{
GPSMaps=off;
OptionalGraphics=off;
MotionVideo=off;
MaxText=128;
}
If speed>50
{
Non-CriticalOnScreenButtons=off;
MaxText=40;
}
```

Figure 2:
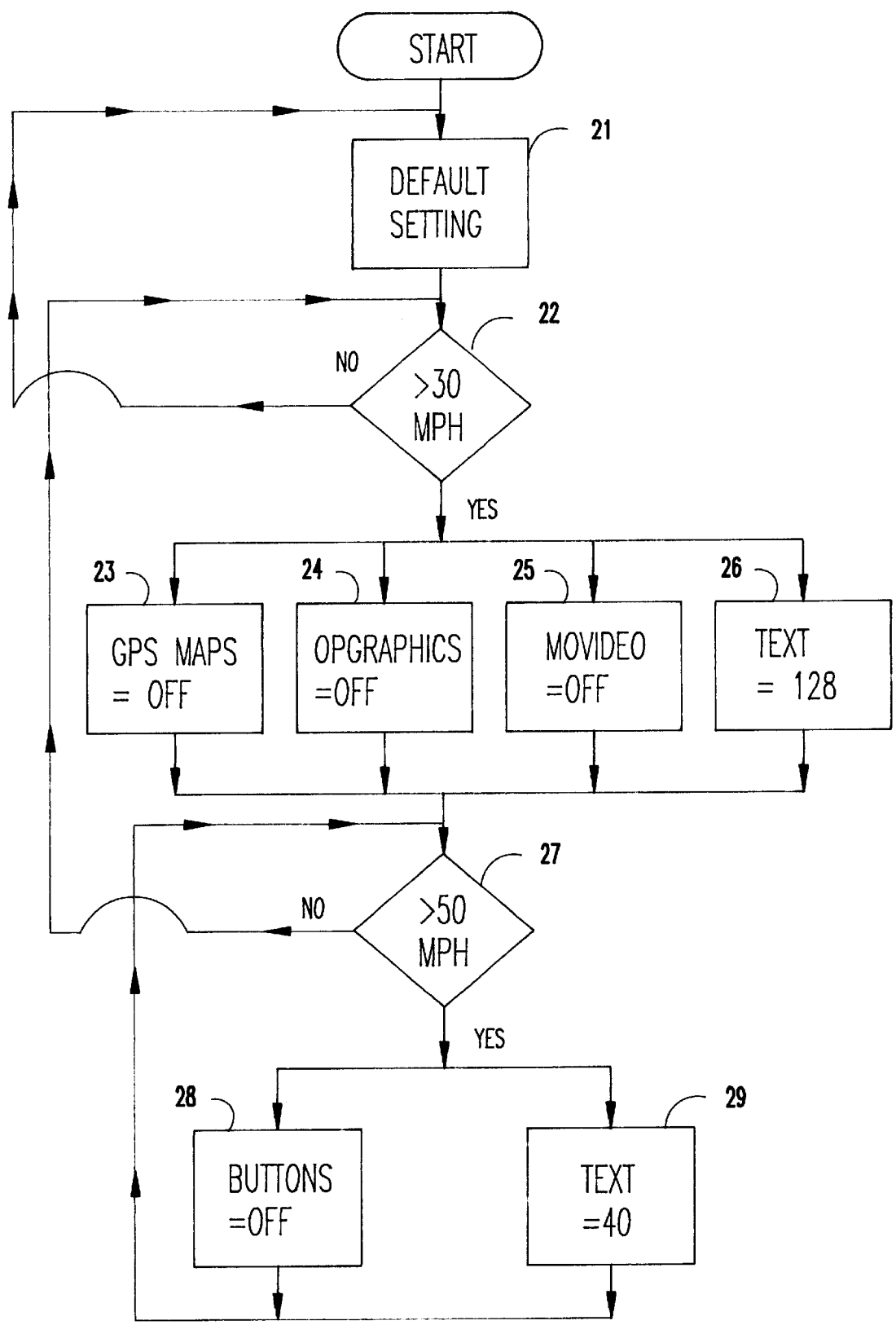
FIG. 2 is a flow diagram showing the logic of the gating module of the system shown in FIG. 1.

FIG. 2 is a flow diagram showing the implementation of the above pseudocode. The process begins when power, typically from an automobile battery, is applied to the electronic devices and the system default settings for each electronic device are invoked, as shown in function block 21. As such, the motor vehicle safety system can be used when the car motor is running, or when the ignition key is positioned so as to provide power to the electronic devices without the motor running. Vehicle speed is then monitored, preferably in real time, by gating module 14. A test is made in decision block 22 to determine if the speed is greater than 30 mph. If not, the process loops back to function block 21, where the default settings are maintained. If the speed exceeds 30 mph, the GPS map display flag is turned to "off" in function block 23, the optional graphics display flag is turned to "off" in function block 24, the motion video (if any) flag is turned to "off" in function block 25, and the maximum text displayed flag is turned to "128" in function block 26. Flags may contain multiple bits to allow for the setting of multiple values rather than simply on or off Thus, for example, if the text function has a two bit flag and both bits are set to "1", then there may, for example, be no limitation to the text display. If one bit is set to "1" and the other bit set "0", then the text display, for example, may be limited to the information content of 128 bits (or some other appropriate value). If both bits are set, for example, to "0", then the text display is limited to the information content of 40 bits (or some other appropriate value).

The next step in the process is to determine in decision block 27 whether the speed exceeds 50 mph. If not, the process loops back to decision block 22 to determine if the speed exceeds 30 mph, and the logic of decision block 22 is again executed, as discussed above. If the test in decision block 27 indicates that the speed exceeds 50 mph, the non-critical screen buttons flag is set to "off" in function block 28, and the maximum text displayed flag is set to "40" in function block 29. The process then loops back to decision block 22 to maintain this state until the speed drops below 50 mph. Upon detecting that the speed has decreased below the thresholds of 50 (as used in this example), the process loops back to decision block 22 to determine if the speed exceeds 30 mph, and the logic of decision block 22 is again executed, as discussed above.

It will be understood that the foregoing is but one example of a rules based system implemented by the gating module 14. As a further example, consider a radio with the following attributes:

a physical volume knob and physical tuning buttons;
on-screen buttons for balance and tone and mute;
on-screen menu for selecting stations by name or musical format;
on-screen graphic showing the album cover;
on-screen video window for showing music videos; and
on-screen text field with the artist name, track, title and song lyrics.

As the vehicle speed increases over 30 mph, the first rule would fire in the gating module 14. The radio would poll the gating module (or receive messages from it) and discover OptionalGraphics (e.g., the album cover graphic) and MotionVideo (e.g., the music video) flags are set prohibiting their display and further that the flag MaxText display has been set to "128". The radio would turn off the graphics and video and limit the textual information to just the artist name and the track title. As the vehicle speed increases to over 50 mph, the radio would, for example, turn off the on-screen buttons for balance and tone (non-critical), leave on-screen the mute (critical), disable the menu-selection system for tuning stations (leaving only the physical buttons for tuning), and perhaps display only the radio station frequency and call letters.

Another example is an on-board cellular telephone which can show an image of the person on the other end of the connection and an on-screen or voice-recognition-based directory of the user's personal telephone book. At speeds over 30 mph, the person's image would, for example, be removed from the screen. At speeds over 50 mph, all screen-based dialing functions would be suppressed, leaving the voice-recognition alternatives for dialing (and perhaps just "hang-up" and "mute" buttons on the screen). Other examples will suggest themselves to those skilled in the art of automotive electronics and safety.

Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A vehicle safety system for determining the state of functionality of electronic devices as a function of speed comprising:

means for applying a set of speed-based rules to control a representation of a state of functionality of vehicle electronic devices responsive to an input signal that indicates speed of a vehicle and in accordance with a speed indicated by said input signal; and means for communicating said representation of the state of functionality to or from the electronic devices.

2. The vehicle safety system recited in claim 1, wherein the state of an electronic device corresponds to being either enabled or disabled.

3. The vehicle safety system recited in claim 2, wherein the control of a state of an electronic device further includes enabling all of the functionality of respective electronic devices or only a portion thereof, as determined by the speed-based rules.

4. The vehicle safety system recited in claim 1, wherein said means for communicating comprises a communication bus to which the electronic devices are connected.

5. The vehicle safety system recited in claim 4, wherein the electronic devices poll said means for applying over the communication bus to determine the state of the electronic devices.

6. The vehicle safety system recited in 1, wherein the means for applying is a gating module.

7. The vehicle safety system recited in claim 6, wherein the gating module uses a set of functionality flags to determine the state of the electronic devices.

* * * * *